United States Patent
Vega et al.

(10) Patent No.: US 10,216,184 B2
(45) Date of Patent: Feb. 26, 2019

(54) APPARATUS AND METHOD FOR CONTROLLING ITS OPERATION

(71) Applicant: NXP B.V., Eindhoven (NL)

(72) Inventors: Victor Vega, Sunnyvale, CA (US); Adrian Koh, Stockport (GB); Peter Esser, Alexandria, VA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/399,732

(22) Filed: Jan. 5, 2017

(65) Prior Publication Data
US 2017/0192421 A1    Jul. 6, 2017

(30) Foreign Application Priority Data

Jan. 5, 2016 (EP) .................................. 16150147

(51) Int. Cl.
| | |
|---|---|
| *B64C 39/02* | (2006.01) |
| *G06K 7/10* | (2006.01) |
| *G05D 1/00* | (2006.01) |
| *H04W 12/06* | (2009.01) |
| *H04W 68/00* | (2009.01) |
| *H04W 4/06* | (2009.01) |
| *G08G 5/00* | (2006.01) |
| *H04W 4/80* | (2018.01) |
| *H04W 4/021* | (2018.01) |
| *H04W 12/08* | (2009.01) |

(52) U.S. Cl.
CPC ......... *G05D 1/0022* (2013.01); *B64C 39/024* (2013.01); *G06K 7/10297* (2013.01); *G06K 7/10544* (2013.01); *G08G 5/006* (2013.01); *H04W 4/021* (2013.01); *H04W 4/06* (2013.01); *H04W 4/80* (2018.02); *H04W 12/06* (2013.01); *H04W 68/00* (2013.01); *B64C 2201/00* (2013.01); *B64C 2201/14* (2013.01); *H04W 12/08* (2013.01)

(58) Field of Classification Search
CPC ............ B64C 2201/00; G06K 7/10297; G06K 7/10386
USPC ............................................................. 701/2
See application file for complete search history.

(56) References Cited

U.S. PATENT DOCUMENTS

| | | | |
|---|---|---|---|
| 8,478,195 B1 | 7/2013 | Hewinson | |
| 9,412,278 B1 * | 8/2016 | Gong | ..................... H04L 63/101 |

(Continued)

FOREIGN PATENT DOCUMENTS

WO    WO-2012/071478 A9    5/2012

OTHER PUBLICATIONS

Extended European Search Report for Patent Appln. No. 16150147.3 (dated Jul. 13, 2016).

(Continued)

*Primary Examiner* — Anshul Sood

(57) ABSTRACT

According to a first aspect of the present disclosure, a apparatus is provided, the apparatus comprising a reader and a controller operatively coupled to the reader, wherein the reader is configured to receive certificate data from an external tag and to provide said certificate data to the controller, and wherein the controller is configured to receive said certificate data from the reader, to verify whether the certificate data are valid, and to enable operation of the apparatus if the certificate data are valid. According to a second aspect of the present disclosure, a corresponding method for controlling the operation of an apparatus is conceived. According to a third aspect of the present disclosure, a corresponding computer program product is provided.

14 Claims, 2 Drawing Sheets

(56) References Cited

U.S. PATENT DOCUMENTS

2013/0238536 A1* 9/2013 Outwater ............ B60L 11/1846
706/12
2014/0277854 A1 9/2014 Jones et al.

OTHER PUBLICATIONS

Morris, P. "How to Get Moto X Motorola Skip Feature on Any NFC-Enabled Android Device", Redmond Pie, 4 pgs, Oct. 12, 2013, retreived from the internet at: http://www.redmondpie.com/how-to-get-moto-x-motorola-skib-feature-on-any-nfc-enabled-android-device/ (Dec. 30, 2016).

"Drone Tracker—Tile's Bluetooth Tracking Locator Helps You Find Your Drone", Tile, 3 pgs, Mar. 11, 2015 retreived from the internet at: https://www.thetileapp.com/blog/drone-recovered-with-tile-app (Dec. 30, 2016).

Lowy, J. "Drone close calls spur government to require registration", PBS Newhour, 3 pgs, retreived from the internet at: http://www.pbs.org/newshour/rundown/drone-close-calls-spur-government-require-registration/ (Oct. 19, 2015).

Rupprecht, J. "The Problems with Mandatory Drone Registration", sUAS News the business of drones, 6 pgs, retreived from the Internet at: https://www.suasnews.com/2015/10/the-problems-with-mandatory-drone-registration/ (Oct. 17, 2015).

Becerra, L. "Google Says Project Wing Drones Will be Delivering to Our Doorsteps by 2017", Gizmodo, 2 pgs, retreived from the internet at: http://gizmodo.com/google-says-project-wing-drones-will-be-delivering-to-o-1740260543 (Mar. 11, 2015).

"FAA to Require Most Drones to Be Registered and Marked", CBS New York, 5 pgs, retreived from the internet at: http://newyork.cbslocal.com/2015/12/14/faa-drone-registration/ (Dec. 14, 2015).

"DNFC Tag: NFC that Interacts with Microcontroller", INDIEGOGO, retrieved from the internet Apr. 23, 2018 at: https://www.indiegogo.com/projects/dnfc-tag-nfc-that-interacts-with-microcontroller#/ (2014).

* cited by examiner

APPARATUS AND METHOD FOR CONTROLLING ITS OPERATION

CROSS-REFERENCE TO RELATED APPLICATIONS

This application claims the priority under 35 U.S.C. § 119 of European patent application no. 16150147.3, filed on Jan. 5, 2016, the contents of which are incorporated by reference herein.

FIELD

The present disclosure relates to an apparatus comprising a reader and a controller. Furthermore, the present disclosure relates to a corresponding method for controlling the operation of an apparatus, and to a corresponding computer program product.

BACKGROUND

Certificate-based control of devices is increasingly important. For example, the registration of drones may be difficult to enforce. Drones are becoming prolific and despite initiatives for registration, most go unregistered, so when hazardous situations arise, such as flights in restricted zones, it is difficult to determine to whom the drone belongs.

SUMMARY

According to a first aspect of the present disclosure, an apparatus is provided, the apparatus comprising a reader and a controller operatively coupled to the reader, wherein the reader is configured to receive certificate data from an external tag and to provide said certificate data to the controller, and wherein the controller is configured to receive said certificate data from the reader, to verify whether the certificate data are valid, and to enable operation of the apparatus if the certificate data are valid.

In one or more embodiments, the controller is further configured to disable operation of the apparatus if the certificate data are invalid.

In one or more embodiments, the certificate data include at least one of the following data: user credentials, use classifications, an insurance certificate.

In one or more embodiments, the apparatus further comprises a long-range wireless communication unit that is operatively coupled to the controller.

In one or more embodiments, the controller is further arranged to transmit, using the long-range wireless communication unit, a notification comprising a user authentication request to a mobile device.

In one or more embodiments, the controller is further configured to broadcast or backscatter, using the long-range wireless communication unit, an identifier of the apparatus to other devices if the certificate data are invalid.

In one or more embodiments, the apparatus is a drone, and the controller is a flight controller.

In one or more embodiments, the apparatus further comprises a GPS module, the flight controller is configured to receive location data from said GPS module, and the flight controller is configured to restrict a flight of the drone to flight zones defined in accordance with the certificate data.

In one or more embodiments, the apparatus further comprises a sensor, and the flight controller is further configured to restrict the flight of the drone in accordance with measurement data received from said sensor.

In one or more embodiments, the controller further comprises a decryption unit for decrypting encrypted certificate data.

In one or more embodiments, the reader is an NFC reader, an RFID reader, a contact-bound reader, or an optical reader.

In one or more embodiments, the apparatus further comprises a secure element for securely storing said certificate data and/or for inhibiting tampering.

In one or more embodiments, a system comprises an apparatus of the kind set forth and a tag.

In one or more embodiments, the tag is embedded in a certification sticker.

According to a second aspect of the present disclosure, a method for controlling the operation of an apparatus is conceived, said apparatus comprising a reader and a controller operatively coupled to the reader, the method comprising: the reader receives certificate data from an external tag; the reader provides said certificate data to the controller; the controller receives said certificate data from the reader; the controller verifies whether the certificate data are valid; the controller enables operation of the apparatus if the certificate data are valid.

According to a third aspect of the present disclosure, a computer program product is provided comprising instructions which, when executed by a processing unit, cause said processing unit to carry out or control steps of a method of the kind set forth.

DESCRIPTION OF DRAWINGS

Embodiments will be described in more detail with reference to the appended drawings, in which.

DESCRIPTION OF EMBODIMENTS

As mentioned above, according to a first aspect of the present disclosure, an apparatus is provided, the apparatus comprising an NFC reader and a controller operatively coupled to the NFC reader. The NFC reader is configured to receive certificate data from an external NFC device and to provide said certificate data to the controller. Furthermore, the controller is configured to receive said certificate data from the NFC reader, to verify whether the certificate data are valid, and to enable operation of the apparatus if the certificate data are valid. This enables an automated conditional activation of the apparatus.

Figure 1:
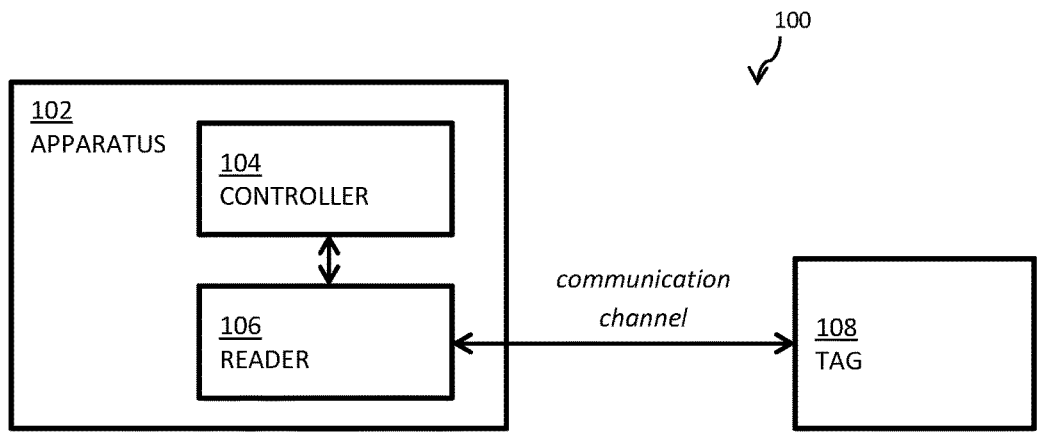
FIG. 1 shows an illustrative embodiment of a system comprising an apparatus of the kind set forth.

FIG. 1 shows an illustrative embodiment of a system 100 comprising an apparatus 102 of the kind set forth. The apparatus 102 comprises a controller 104 operatively coupled to a reader 106, for example an NFC reader. In a practical and efficient implementation, the controller 104 is a microcontroller. In operation, the reader 106 may establish communication with an external tag 108. In a practical and efficient implementation, the external tag 108 is an NFC tag, in particular an NFC tag embedded in a certification sticker. In that case, the certification sticker may simply be adhered to the housing of the apparatus, which effectively brings the NFC tag into proximity of the NFC reader 106. NFC is useful because it is limited to short communication ranges, which may reduce the probability that certificate data are intercepted. However, the skilled person will appreciate that the present disclosure is not limited to NFC. That is to say, alternatively, the reader may be an NFC reader, an RFID reader, a contact-bound reader, or an optical reader.

Subsequently, the reader 106 may retrieve certificate data from the tag and pass them on to the controller 104. Then, the controller 104 may verify whether the certificate data are valid, for example by comparing them with reference data stored in a memory unit of said controller (not shown). If the certificate data are valid, the controller may enable operation of the apparatus, for example by powering up and/or unlocking functional components of the apparatus (not shown). In order to protect the certificate data, they may have been stored on the tag in encrypted form. In that case, the controller may further comprise a decryption unit for decrypting the encrypted certificate data.

It is noted that the certificate data may in principle be any data that enables identification of the apparatus. For instance, suitable certificate data may include one of the following data: a serial number, a model number or other identifier, a manufacturer identifier, owner data, a registration number, an expiration date, a zone classification.

NFC-based registration certificates may be similar to a typical vehicle registration sticker, adhered to a license plate. However, unlike a simple sticker, the NFC-based version may include key information, such as a registration number, a model number, a serial number, and a classification of the certificate. Furthermore, the certificate may contain various security provisions to help authenticate the validity of the issued certificate, limiting issuance only by authorized entities, for example—in case the apparatus is a drone—the Federal Aviation Administration (FAA) in the United States or other governmental agencies. Furthermore, in one or more embodiments, the controller may set permissible zones of operation using the certificate data.

The process might also include "on the spot" registrations whereby the consumer may obtain a registration certificate where an apparatus is purchased, for immediate activation. Furthermore, a government agency, such as the FAA, can quantify the sale of a license as it is "smart" and not just an easily duplicated sticker. Also, a special "private key" which is valid exclusively for sale to the authorized government agencies may be added to the certificate by its manufacturer; in that case verifying the certificate data may include verifying the key. Furthermore, authorized issuers, such as retailers, may perform on the spot registrations: enter in the cloud, take a payment (a cut for their processing and for the registration sticker to help fund the government program) and activate and issue the sticker to the customer for immediate use.

When a valid certificate is applied to the apparatus 102, the reader 106 processes the certificate data and provides them to the controller 104. In a practical and efficient implementation, the reader 106 transmits the certificate data to the controller 104 via a wired connection. Alternatively, there may be a wireless connection between the reader 106 and the controller 104, through which the certificate data may be transmitted. Furthermore, the controller may include the reader. The controller 104 may then provision the device for operability. The applicable certification credentials may be securely stored within the controller 104.

Furthermore, in one or more embodiments, the controller 104 is configured to disable operation of the apparatus if the certificate data are invalid. This may be useful in case the apparatus—or a specific part thereof—is already operational. For example, in case an invalid certificate is presented to the reader 106, the controller 104 may deactivate certain functional components of the apparatus.

Furthermore, in one or more embodiments, the apparatus further comprises a secure element for securely storing said certificate data and/or for inhibiting tampering. For instance, the secure element may take the form of a protected memory which is tamper-resistant.

In one or more embodiments, the apparatus 102 is a drone and the controller 104 is a flight controller. Furthermore, in some embodiments, the apparatus 102 further comprises a GPS module (not shown). In that case, the flight controller may be configured to receive location data from said GPS module. Furthermore, the flight controller may be configured to restrict a flight of the drone to flight zones defined in accordance with the certificate data. This facilitates the automated enforcement of flight restrictions. For example, after reading the certificate credentials, the flight controller and GPS module may work in tandem to create virtual flight zone boundaries, such as restricting commercial licensed operators from entering airport zones, or equivalent. Other wireless options may provide additional content such as regional flight restricted areas, in order to reduce the size of the database required in the flight controller. In a simple drone scenario, a certificate may be "regional only" and the drone may contain sufficient data to know which zones are restricted in a certain region, based upon the zone classification provided by the certificate. In more elaborate drones, which are not restricted to specific regions, bidirectional data feeds via a wireless communication channel may facilitate the identification of restricted zones.

Furthermore, in one or more embodiments, the apparatus further comprises a sensor, wherein the flight controller is further configured to restrict the flight of the drone in accordance with measurement data received from said sensor. For example, electromagnetic sensors might detect the presence of high voltage lines and curb the flight path. Furthermore, other sensors may detect "zone barrier beacons" and restrict the flight to a zone indicated by said beacons. Yet further sensors may detect heavily populated areas (stadiums, parks, public locations) and prohibit entry to such areas (for safety reasons)—unless an approved registration classification is provided.

The skilled person will appreciate that the present disclosure is not limited to drones. In particular, the presently disclosed apparatus and method may be useful to help prevent theft of devices as well. For example, if high value products (e.g., tablets, vehicles, rentals, leased equipment) are targets for theft, these products may be made inoperable until an authorization sticker (optionally dated for expiration) were applied. Alternatively, in case of a purchase, a "sticker of purchase" may enable the product. A practical scenario would be the following. In case of leased equipment: a user leases heavy construction equipment for a 2-day period, but it spans over the weekend before it can be returned, so the user actually uses it for Thu/Fri/Sat/Sun, but only pays for Thu/Fri—in that case the sticker is only valid for 2 days and the equipment is inoperable on Sat/Sun.

Figure 2:
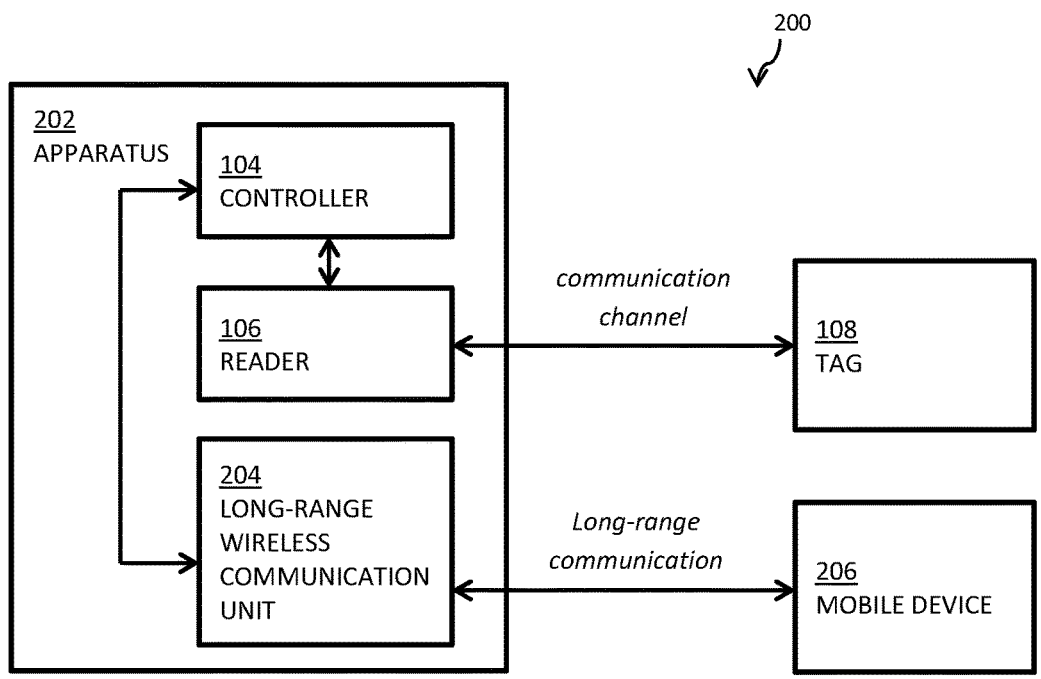
FIG. 2 shows another illustrative embodiment of a system comprising an apparatus of the kind set forth.

FIG. 2 shows another illustrative embodiment of a system 200 comprising an apparatus 202 of the kind set forth. In addition to the components shown in FIG. 1, the apparatus 202 comprises a long-range wireless communication unit 204. In a practical and efficient implementation, the long-range wireless communication unit 204 is a Bluetooth Low Energy (BLE) communication unit. The long-range wireless communication unit 204 may establish long-range communication with an external mobile device 206. Thus, in one or more embodiments, the apparatus 202 comprises a long-range wireless communication unit 204 that is operatively coupled to the controller 104. This may alleviate, in case the apparatus is a drone, at least some drone delivery problems. For example, when a consumer places an online order for a product, a drone may be used to deliver the parcel, but it may need an "eSignature" prior to approaching the delivery area. A notification might be sent to the consumer, arranging for a convenient time of delivery, and upon approach, a notification might be provided to the consumer's mobile device (e.g., smart phone), requesting acceptance (e.g. eSignature). This may be accomplished via BLE or similar technology (e.g., cellular/4G/LTE), so that the drone would maintain a distance until verification of the eSignature were received, then land and release the package. Thus, in one or more embodiments, the controller is further arranged to transmit, using the long-range wireless communication unit, a notification comprising a user authentication request to a mobile device.

Figure 3:
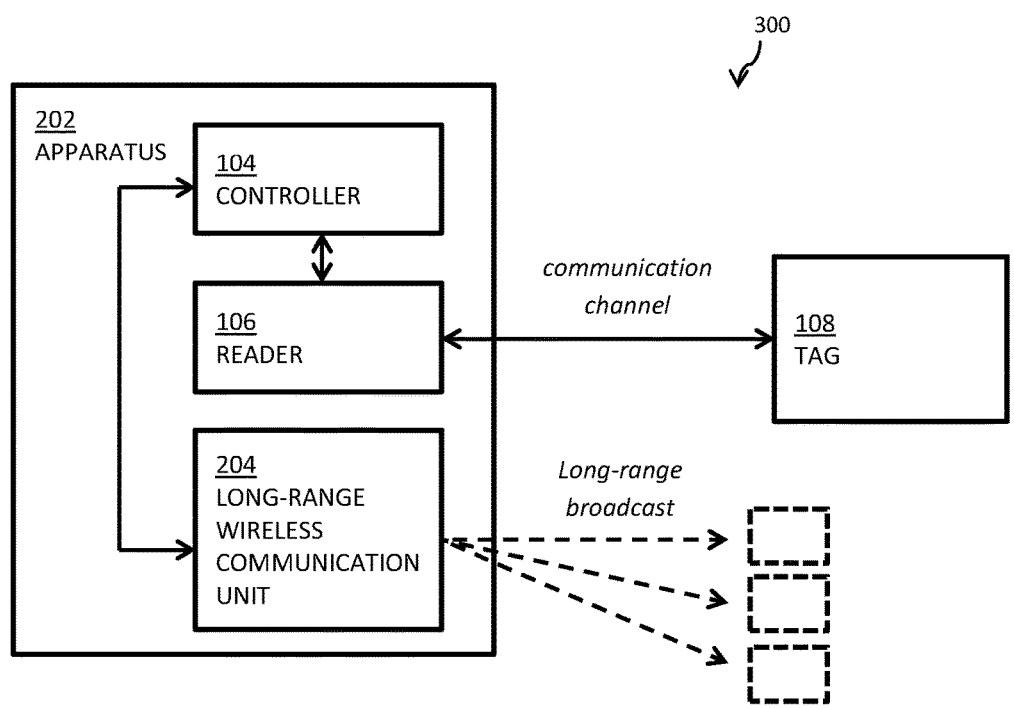
FIG. 3 shows a further illustrative embodiment of a system comprising an apparatus of the kind set forth.

FIG. 3 shows a further illustrative embodiment of a system 300 comprising an apparatus 202 of the kind set forth. In this embodiment, the long-range wireless communication unit 204 may broadcast data to a plurality of external devices. This may facilitate the detection of violators, particularly in the following way. Connected vehicles, aircraft, drones, etc. could broadcast unregistered identification to help detect violators, e.g. if a device passes a choke point and is not registered, a serial number (or Vehicle Identification Number, VIN, in the case of a vehicle) could be broadcasted by a wireless technology. This may be done, for example, if the device passes a receiver/transmitter in a restricted area (like an airport or a densely populated area like a mall or stadium) or if it is in the vicinity of another airborne vehicle (e.g., a helicopter or an airplane).

Thus, in one or more embodiments, the controller 104 is configured to broadcast, through the long-range wireless communication unit 204, an identifier of the apparatus to other devices if the certificate data are invalid. That is to say, if a registration certificate is issued or applied, then the registration ID may be broadcasted or backscattered to other receivers. If no registration certificate is applied, then the drone may only broadcast that it is unregistered. It is noted that the long-range wireless technology is not limited to active devices (i.e., having an internal power source), but it includes passive solutions such as ultra-high frequency (UHF) passive tags. Furthermore, it includes solutions based on long-range low-latency wireless communication technology, such as LTE V2X based on 5G or 802.11p. For example, V2X based on 802.11p may provide an ad-hoc broadcast of the UAV ID, position and flight direction. Furthermore, also if the certificate data are valid, the long-range wireless communication unit 204 may be useful. As an example for the drone, upon application of the certificate, the credentials may be transmitted from the tag to the reader within the drone, and handed over to the controller. The controller can then broadcast an identifier of the drone (drone ID) to longer-range communication devices (e.g., Wi-Fi, 4G/Cellular, BT, BLE, UHF RFID, LTE V2X, 5G, 802.11p). In this way, the drone may also be identified by an aircraft, for example, when the drone comes into the aircraft's proximity. Furthermore, a drone may be identified when it comes in proximity of monitored and/or restricted areas. Thus, since a certificate is typically registered, the owner of a drone which creates a hazardous situation may be traced more easily.

Thus, one or more embodiments may include long-range wireless communication. For example, if a drone is of a type whereby a more complex GPS/flight control module is not used to restrict flight paths, the controller could read the certificate data (which may include the drone ID) and wirelessly broadcast the ID to other entities. This is especially useful where the small registration ID is not easily visible to the eye. In this scenario, the ID is broadcasted and other entities (including airborne vehicles or receivers, for example over populated areas or restricted zones) may identify the violator. The same applies if a drone crashes or is in a restricted area. The wireless communication may include a variety of options, including RFID backscatter (e.g. UHF), active beaconing, radar, cellular/4G/LTE, BT/BLE, Peer-2-Peer, etc.

Specifically, the long-range wireless communication may be based on long-range low-latency wireless communication technology, such as in accordance with LTE V2X (Vehicle-to-X) based on 5G or on the 802.11p standard. It is noted that V2X based on 802.11p may provide ad-hoc broadcast of an Unmanned Aerial Vehicle (UAV) ID, position and flight direction. An UAV eLicense ID may be assigned by the FAA during registration to a specific microcontroller (MCU) ID embedded in a hardware security module (HSM) with a tamper detection module (TDM). A low-latency technology may provide optimization for communication with a moving object. In particular, LTE V2X based on 5G or on 802.11p is optimized for communication with moving objects. Furthermore, in case the UAV is equipped with a cellular module, it may be remotely disabled in a restricted area, or the geofence window may be shrunk dynamically to further restrict the flight zone (for example, if it is a known rogue UAV).

In one or more embodiments, the certificate data include user credentials. This may be useful, for example, in case the apparatus is a rented device. In that case, the user credentials may include the renter's credentials and optionally a lease/rental expiration date. Upon a positive verification of these credentials, the controller may enable operation of the apparatus.

Furthermore, in one or more embodiments, the certificate data include use classifications. This may be useful in various situations. For instance, by conveying an authorized classification to the controller, virtual boundaries may be implemented, restricting the use of vehicles, drones and other devices in unauthorized zones.

Furthermore, in one or more embodiments, the certificate data include an insurance certificate. This may be useful in case the insurance of the apparatus should be verified. Thus, vehicles, drones and other devices may not be made operational until the insurance certificate is validated. For example, in case the apparatus is a vehicle, an invalid insurance certificate may cause the vehicle to become inoperable and/or a signal may be emitted to report the violation. It is noted that emitting said signal may be done by updating the tag itself or by transmitting or backscattering the violation and license number by any other wireless system.

As mentioned above, according to a third aspect of the present disclosure, a computer program product is provided comprising instructions which, when executed by a processing unit, cause said processing unit to carry out or control steps of a method of the kind set forth. Thus, in accordance with the present disclosure, at least a part of the method may be implemented in software. However, the skilled person will appreciate that the present disclosure is not limited to software-implemented methods. For example, at least a part of the method may be implemented in hardware, simple state logic and/or a simple state machine.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 system
102 apparatus
104 controller
106 reader
108 tag
200 system
202 apparatus
204 long-range wireless communication unit
206 mobile device
300 system

The invention claimed is:

1. An apparatus comprising:
   a housing;
   a certification sticker adhered to the housing, the certification sticker including an NFC tag embedded therein;
   an NFC reader;
   a controller operatively coupled to the NFC reader;
   wherein the NFC reader is configured to:
   receive certificate data from the NFC tag that is embedded in the certification sticker that is adhered to the housing of the apparatus;
   provide said certificate data to the controller; and
   wherein the controller is configured to:
   receive said certificate data from the NFC reader;
   verify whether the certificate data are valid;
   enable operation of the apparatus if the certificate data are valid;
   wherein the apparatus is a drone and the controller is a flight controller;
   wherein the controller is further configured to set permissible zones of operation using the certificate data.

2. An apparatus as claimed in claim 1, wherein the controller is further configured to disable operation of the apparatus if the certificate data are invalid.

3. An apparatus as claimed in claim 1, wherein the certificate data include at least one of the following data: user credentials, use classifications, an insurance certificate.

4. An apparatus as claimed in claim 1, further comprising a long-range wireless communication unit that is operatively coupled to the controller.

5. An apparatus as claimed in claim 4, wherein the controller is further arranged to transmit, using the long-range wireless communication unit, a notification comprising a user authentication request to a mobile device.

6. An apparatus as claimed claim 4, wherein the controller is further configured to broadcast or backscatter, using the long-range wireless communication unit, an identifier of the apparatus to other devices if the certificate data are invalid.

7. An apparatus as claimed in claim 1, further comprising a GPS module, wherein the flight controller is configured to receive location data from said GPS module, and wherein the flight controller is configured to restrict a flight of the drone to flight zones defined in accordance with the certificate data.

8. An apparatus as claimed in claim 1, further comprising a sensor, wherein the flight controller is further configured to restrict the flight of the drone in accordance with measurement data received from said sensor.

9. An apparatus as claimed in claim 1, wherein the controller further comprises a decryption unit for decrypting encrypted certificate data.

10. An apparatus as claimed in claim 1, further comprising a secure element for securely storing said certificate data and/or for inhibiting tampering.

11. A method for controlling the operation of an apparatus, said apparatus comprising a reader and a controller operatively coupled to the reader, wherein:
   a certification sticker is adhered to the apparatus, the certification sticker including an NFC tag embedded therein;
   the reader receives certificate data from the NFC tag that is embedded in the certification sticker that is adhered to the apparatus;
   the reader provides said certificate data to the controller;
   the controller receives said certificate data from the reader;
   the controller verifies whether the certificate data are valid;
   the controller enables operation of the apparatus if the certificate data are valid;
   wherein the apparatus is a drone and the controller is a flight controller;
   wherein the controller is further configured to set permissible zones of operation using the certificate data.

12. A computer program product comprising instructions which, when executed by a controller, cause said controller to carry out or control steps of a method as claimed in claim 11.

13. A drone comprising:
   a housing;
   a certification sticker adhered to the housing of the drone, the certification sticker including an NFC tag embedded therein;
   an NFC reader;
   a controller operatively coupled to the NFC reader;
   wherein the NFC reader is configured to:
   receive certificate data from the NFC tag that is embedded in the certification sticker that is adhered to the housing of the apparatus;
   provide said certificate data to the controller; and
   wherein the controller is configured to:
   receive said certificate data from the NFC reader;
   verify whether the certificate data are valid;
   enable operation of the apparatus if the certificate data are valid.

14. The drone of claim 13, wherein the controller is a flight controller and wherein the controller is further configured to set permissible zones of operation using the certificate data.

* * * * *